United States Patent
Heath

(10) Patent No.: US 8,909,534 B1
(45) Date of Patent: Dec. 9, 2014

(54) SPEECH RECOGNITION TRAINING

(75) Inventor: Taliver Heath, Mountain View, CA (US)

(73) Assignee: Google Inc., Mountain View, CA (US)

( * ) Notice: Subject to any disclaimer, the term of this patent is extended or adjusted under 35 U.S.C. 154(b) by 320 days.

(21) Appl. No.: 13/416,378

(22) Filed: Mar. 9, 2012

(51) Int. Cl.
    *G10L 21/00*     (2013.01)
    *G10L 15/00*     (2013.01)
    *G10L 15/06*     (2013.01)
    *G10L 15/32*     (2013.01)

(52) U.S. Cl.
    CPC   *G10L 15/06* (2013.01); *G10L 15/32* (2013.01)
    USPC ........................................ 704/270.1; 704/243

(58) Field of Classification Search
    CPC ........................................................ G10L 15/06
    See application file for complete search history.

(56) References Cited

U.S. PATENT DOCUMENTS

| | | | |
|---|---|---|---|
| 5,828,735 A | 10/1998 | Farfan | |
| 6,704,709 B1 | 3/2004 | Kahn et al. | |
| 6,839,667 B2 * | 1/2005 | Reich | 704/240 |
| 7,729,917 B2 * | 6/2010 | Miyamoto et al. | 704/270 |
| 7,801,756 B1 * | 9/2010 | Harinarayan et al. | 705/7.14 |
| 8,041,565 B1 * | 10/2011 | Bhardwaj et al. | 704/235 |
| 8,407,052 B2 * | 3/2013 | Hager | 704/244 |
| 8,554,605 B2 * | 10/2013 | Oleson et al. | 705/7.41 |
| 2008/0162132 A1 * | 7/2008 | Doulton | 704/235 |
| 2013/0017523 A1 * | 1/2013 | Barborak et al. | 434/322 |
| 2013/0110509 A1 * | 5/2013 | Cath et al. | 704/235 |
| 2013/0132080 A1 * | 5/2013 | Williams et al. | 704/235 |

OTHER PUBLICATIONS

Williams, Jason D., et al. "Crowd-sourcing for difficult transcription of speech." Automatic Speech Recognition and Understanding (ASRU), 2011 IEEE Workshop on. IEEE, 2011.*

Lane, Ian, et al. "Tools for collecting speech corpora via Mechanical-Turk." Proceedings of the NAACL HLT 2010 Workshop on Creating Speech and Language Data with Amazon's Mechanical Turk. Association for Computational Linguistics, 2010.*

(Continued)

*Primary Examiner* — Brian Albertalli

(74) *Attorney, Agent, or Firm* — Shumaker & Sieffert, P.A.

(57) ABSTRACT

A method may include selecting, by a computing device, sets of two or more text candidates from a plurality of text candidates corresponding to vocal input. The method may further include for each set, providing, by the computing device, representations of each of the respective two or more text candidates in the set to users, wherein the representations are provided as audio. The method may further include receiving a selection from each of the users of one of a text candidate from the set, wherein the selection is based on satisfying a criterion. The method may further include determining that a text candidate included in the plurality of text candidates has a highest probability out of the plurality of text candidates of being a correct textual transcription of the vocal input based at least in part on selections from the users.

25 Claims, 6 Drawing Sheets

(56) References Cited

OTHER PUBLICATIONS

Parent, Gabriel, and Maxine Eskenazi. "Toward better crowdsourced transcription: Transcription of a year of the let's go bus information system data." Spoken Language Technology Workshop (SLT), 2010 IEEE. IEEE, 2010.*

Callison-Burch, Chris, and Mark Dredze. "Creating speech and language data with Amazon's Mechanical Turk." Proceedings of the NAACL HLT 2010 Workshop on Creating Speech and Language Data with Amazon's Mechanical Turk. Association for Computational Linguistics, 2010.*

Marge, Matthew, Satanjeev Banerjee, and Alexander I. Rudnicky. "Using the Amazon Mechanical Turk for transcription of spoken language." Acoustics Speech and Signal Processing (ICASSP), 2010 IEEE International Conference on. IEEE, 2010.*

Scott Novotney et al., Cheap, Fast and Good Enough: Automatic Speech Recognition with Non-Expert Transcription, Human Language Technologies: The 2010 Annual Conference of the North American Chapter of the ACL, Jun. 2010, pp. 207-215.

\* cited by examiner

SPEECH RECOGNITION TRAINING

TECHNICAL FIELD

The disclosure relates to speech recognition training

BACKGROUND

Vocal input has become an increasingly popular form of input for computing devices. However, speech recognition engines remain imperfect. Speech recognition training is one useful technique for improving the accuracy of speech recognition engines.

SUMMARY

In one example, the disclosure is directed to a method. The method may include selecting, by a computing device, sets of two or more text candidates from a plurality of text candidates corresponding to vocal input. The method may further include, for each set, providing, by the computing device, representations of each of the respective two or more text candidates in the set to users, wherein the representations are provided as audio. The method may further include receiving a selection from each of the users of one of a text candidate from the set, wherein the selection is based on satisfying a criterion. The method may further include determining that a text candidate included in the plurality of text candidates has a highest probability out of the plurality of text candidates of being a correct textual transcription of the vocal input based at least in part on selections from the users. In some examples, the criterion may be tied to the users' subjective evaluation, such as the most nonsensical or the most illogical text candidate out of the respective two or more text candidates.

In another example, the disclosure is directed to a computing device. The computing device may include one or more processors. The computing device may further include a selection module being executed by the one or more processors and configured to select sets of two or more text candidates from a plurality of text candidates corresponding to vocal input. The computing device may further include a user interface configured to, for each set, provide representations of each of the respective two or more text candidates in the set to users, wherein the representations are provided as audio, and to receive a selection from each of the users of one of a text candidate from the set, wherein the selection is based on satisfying a criterion. The computing device may further include a determination module configured to determine that a text candidate included in the plurality of text candidates has a highest probability out of the plurality of text candidates of being a correct textual transcription of the vocal input based at least in part on selections from the users.

In another example, the disclosure is directed to a computer-readable medium containing instructions. The instructions, when executed on at least one processor, may cause the at least one processor to perform operations. The operations may include selecting, by a computing device, sets of two or more text candidates from a plurality of text candidates corresponding to vocal input. The instructions may further include for each set, providing, by the computing device, representations of each of the respective two or more text candidates in the set to users, wherein the representations are provided as audio. The instructions may further include receiving a selection from each of the users of one of a text candidate from the set, wherein the selection is based on satisfying a criterion. The instructions may further include determining that a text candidate included in the plurality of text candidates has a highest probability out of the plurality of text candidates of being a correct textual transcription of the vocal input based at least in part on selections from the users.

In another example, the disclosure is directed to a method. The method may include receiving, by a computing device, two or more text candidates out of a plurality of text candidates corresponding to a vocal input, wherein the plurality of text candidates are obtained from at least one automated speech recognition engine. The method may further include presenting, by the computing device, representations of the two or more text candidates to a plurality of users and a request for user selection of one of the representations that better satisfies a criterion, the criterion being most nonsensical. The method may further include receiving the user selections of one of the representations that better satisfies the criterion from one or more of the plurality users. The method may further include determining that a text candidate included in the plurality of text candidates has a highest probability out of the plurality of text candidates of being a correct textual transcription of the vocal input based at least in part on being the least-selected candidate of the user selections.

In another example, the disclosure is directed to a computing device. The computing device may include one or more processors. The computing device may further include a network interface configured to receive two or more text candidates out of a plurality of text candidates corresponding to a vocal input, wherein the plurality of text candidates are obtained from at least one automated speech recognition engine. The computing device may further include a user interface configured to present representations of the two or more text candidates to a plurality of users and a request for user selection of one of the representations that better satisfies a criterion, the criterion being most nonsensical, and wherein the user interface is further configured to receive the user selections of one of the representations that better satisfies the criterion from one or more of the plurality users. The computing device may further include a determination module configured to determine that a text candidate included in the plurality of text candidates has a highest probability out of the plurality of text candidates of being a correct textual transcription of the vocal input based at least in part on being the least-selected candidate of the user selections.

In another example, the disclosure is directed to a method. The method may include receiving, by a computing device, a plurality of text candidates corresponding to a vocal input, wherein the plurality of text candidates are obtained from an automated speech recognition engine are obtained from at least one automated speech recognition engine. The method may further include arranging, by the computing device, the plurality of text candidates in a tournament bracket. The method may further include presenting, by the computing device, representations of two or more text candidates facing off in a matchup in the tournament bracket to a user and a request for user selection of one of the representations that better satisfies a criterion. The method may further include receiving the user selection of one of the representations that better satisfies the criterion from the user. The method may further include determining that a text candidate included in the plurality of text candidates has a highest probability out of the plurality of text candidates of being a correct textual transcription of the vocal input based at least in part on the user selection.

In another example, the disclosure is directed to a computing device. The computing device may include one or more processors. The computing device may further include a network interface configured to receive a plurality of text candidates corresponding to a vocal input, wherein the plurality of text candidates are obtained from an automated speech recognition engine are obtained from at least one automated speech recognition engine. The computing device may further include a selection module configured to arrange the plurality of text candidates in a tournament bracket. The computing device may further include a user interface configured to present representations of two or more text candidates facing off in a matchup in the tournament bracket to a user and a request for user selection for one of the representations that better satisfies a criterion, and wherein the user interface is further configured to receive the user selection of one of the representations that better satisfies the criterion from the user. The computing device may further include a determination module configured to determine that a text candidate included in the plurality of text candidates has a highest probability out of the plurality of text candidates of being a correct textual transcription of the vocal input based at least in part on the user selection.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
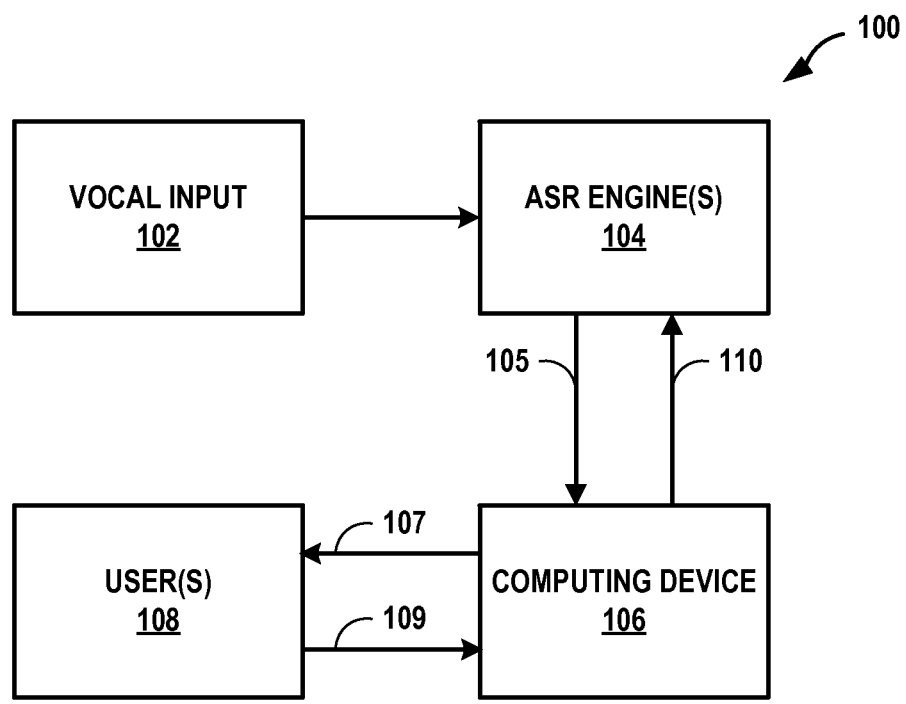
FIG. 1 is a block diagram illustrating an example system that may be configured to crowdsource an example text transcription based on an example vocal input according to some aspects of the present disclosure.

In general, aspects of this disclosure include training automatic speech recognition (ASR) engines by crowdsourcing a consensus as to the correct text transcription for vocal input. Factors such as heavily accented speech or ambient noise may make speech less intelligible and more difficult to recognize by ASR engines, thereby lowering the recognition rates of ASR engines. Furthermore, because more time and effort has been spent developing ASR engines to recognize English and other western language speech, the recognition rates of non-English language ASR engine may tend to lag behind in comparison. Because humans may be able to decipher less intelligible speech with more accuracy by using higher-level knowledge, such as the context of the speech or other pragmatics, human assistance in selecting the correct text transcription for vocal input may be useful in training ASR engines to more accurately convert vocal input to text.

For vocal input having a low recognition rate, a single ASR engine might not be able to decide on a single text transcription corresponding to the vocal input, but may produce several plausible versions of text transcriptions based on the vocal input. Alternatively, multiple ASR engines may not be able to all agree on a single text transcription based on the vocal input, but may produce multiple plausible text transcriptions based on the vocal input.

Therefore, aspects of the disclosure may be directed towards using human knowledge to pick the text transcription from a plurality of text transcriptions that has the highest probability of being the correctly transcribed text. Pairs of transcribed text candidates (or other sets, e.g., set of three or four) may be recited or otherwise provided to a user. For example, the user can be a user that is available, such a user waiting for a service or event. In one example, the user is waiting on hold during a phone call. The user may be prompted to select one of the pair of transcribed text candidates based on a subjective criterion. For example, the user may be prompted to select the transcribed text candidate that sounds the funniest to the user. In this way, the user may select the transcribed text candidate out of the pair of transcribed text candidates that is less likely to be the correct text transcription.

The process may continue with other pairs of transcribed text candidates until the user is no longer on hold. The process may also be repeated for many other users, so that a large enough sample may be collected for the process to be statistically valid, or for the process to exceed a specific confidence level. For example, the process may be repeated until each transcribed text candidate has been presented in a pair to users at least a threshold number of times (such as at least once, 10 times, 100 times, 500 times, or 1000 times). In this way, a sufficient sampling of user input may be collected. Once a sufficient sample of user input as to the transcribed text candidates has been detected, the transcribed text candidate that is most probably the correct text transcription for the vocal input may be the transcribed text candidate that the fewest number of users have chosen as being the funniest sounding.

FIG. 1 is a block diagram illustrating an example system 100 for crowdsourcing an example text transcription 110 based on an example vocal input 102. One or more automatic speech recognition (ASR) engines 104 may receive a vocal input 102. The one or more ASR engines 104 may produce a plurality of text candidates 105 based on the vocal input 102. The plurality of text candidates 105 may be candidate textual transcriptions of the vocal input 102. Representations 107 of the plurality of text candidates 105 may be presented by a computing device 106 to one or more users 108 and, based on selections 109 by the one or more users 108 of the plurality of text candidates 105, a text candidate in the plurality of text candidates 105 may be determined to most likely be a correct textual transcription 110 of the vocal input 102.

Vocal input 102 may include one or more spoken words in any language recognized by the one or more ASR engines 104. The one or more ASR engines 104 may include any combination of computer software, and computer hardware that converts spoken words into text. The one or more ASR engines 104 may receive the vocal input 102 and may convert the vocal input 102 into the plurality of text candidates 105. In some examples, the one or more ASR engines 104 may be included in the computing device 106. Alternatively, the one or more ASR engines 104 may be external to the computing device 106, and may communicate the plurality of text candidates 105 produced by the ASR engines 104 to the computing device 106 so that the computing device 106 may be able to present representations 107 of the plurality of text candidates 105 to the one or more users 108.

Each one of the one or more ASR engines 104 may produce one text candidate in the plurality of text candidates 105. Alternatively, the one or more ASR engines 104 may be a single ASR engine that may produce the plurality of text candidates 105. In some examples, the single ASR engine may include a plurality of text-to-speech algorithms, and each one of the algorithms may produce one text candidate in the plurality of text candidates 105. In still other examples, a single algorithm may itself produce the plurality of text candidates 105.

The computing device 106 may be any general purpose computer, including but not limited to a server system, a desktop computing device, a mobile computing device, and the like. In some examples, the computing device 106 may be a distributed computing system, e.g., linked servers. The computing device 106 may repeatedly select two or more text candidates from the plurality of text candidates 105 produced by the one or more ASR engines 104 corresponding to the vocal input 102. For example, the computing device 106 may repeatedly select different pairs of the plurality of text candidates from the plurality of text candidates 105. The computing device 106 may repeatedly select two or more text candidates from the plurality of text candidates 105 until each one of the plurality of text candidates 105 has been selected at least a threshold number of times. For example, the threshold number of times may be at least once, 10 times 100 times, or 1000 times. In one example, the threshold number of times may be based on presenting a large enough sample size of text candidates to the one or more users 108 to form a statistically significant determination of the textual transcription 110.

After each selection of the two or more text candidates, the computing device 106 may provide representations 107 of the respective two or more text candidates to one of the one or more users 108. The computing device 106 may provide the representations 107 at a user interface (not shown) that the one of the one or more users 108 may interact with. Alternatively, the computing device 106 may provide the representations 107 via a network to a device, including but not limited to a phone or a computer, which is associated with the one of the one or more users 108.

The computing device 106 may provide to the one or more users 108 textual or audio representations of the respective two or more text candidates. The audio representations of the two or more text candidates may be produced by a text-to-speech engine in the computing device 106. In some examples, the audio representations may be sent to a phone or computer associated with the one of the one or more users 108. In some examples, the textual representations may be sent to a user's device, and the user's device may convert the textual representations to audio representations via a text-to-speech engine running on that computer and present the textual representations to the user as audio. In other examples, the user's device may present the textual representations to the user as text on a display.

Along with providing the representations 107 of the text candidates, the computing device 106 may also prompt users 108 to select one of the text candidates. The prompting may include prompting users to select the text candidate that appears the most nonsensical or illogical to the user. For example, the computing device 106 may prompt users 108 to select the "funniest" or the "strangest" text candidate. The prompting may include prompting users to select the text candidate that appears the most logical to the user. For example, the computing device 106 may prompt users 108 to select the "least funny", the "least strange," or "the most likely to be part of normal conversation."

After providing each representation 107 of the text candidates to the users 108, the computing device 106 may receive from each of the users 108 a selection 109 of one of the text candidates. Users 108 may press a button, click a link, or otherwise select a text candidate on a phone or computer to provide a selection 109 to the computing device 106. After a user provides her selection 109, the computing device 106 may select another set of text candidates from the plurality of text candidates 105 to present. The second set of text candidates may be different from or may be the same as a prior set of text candidates, typically the set is different and includes at least two text candidates that have not been previously presented to the particular user. For example, the second set of text candidates can be candidates for a different vocal input that then vocal input corresponding to the prior set of text candidates.

The computing device 106 may determine that a text candidate has a highest probability out of the plurality of text candidates 105 of being a correct textual transcription 110 of the vocal input 102 based at least in part on the selections 109 of the users 108. If the computing device 106 had prompted the one or more users 108 to select the text candidate that appears the most nonsensical or illogical to the one or more users 108, then the text candidate having the highest probability out of the plurality of text candidates 105 of being a correct textual transcription 110 of the vocal input 102 may be the text candidate that is a least-selected candidate by the one or more users 108 out of the plurality of text candidates 105. Alternatively, if the computing device 106 had prompted the one or more users 108 to select the text candidate that appears the most logical to the one or more users 108, then the text candidate having the highest probability out of the plurality of text candidates 105 of being a correct textual transcription 110 of the vocal input 102 may be the text candidate that is a most-selected candidate by the one or more users 108 out of the plurality of text candidates 105. These determinations can also be made using the computing device 106. For example, the computing device 106 can apply statistics and, e.g., can require that the most-selected candidate be chosen by at least a statistically significant number of times based on the collected sample information.

The correct textual transcription 110 of the vocal input 102 may be sent to the one or more ASR engines 104. The correct textual transcription 110 may be used to train the one or more ASR engines 104. The one or more ASR engines 104 may also provide the correct textual transcription 110 to an external device or system.

Figure 2:
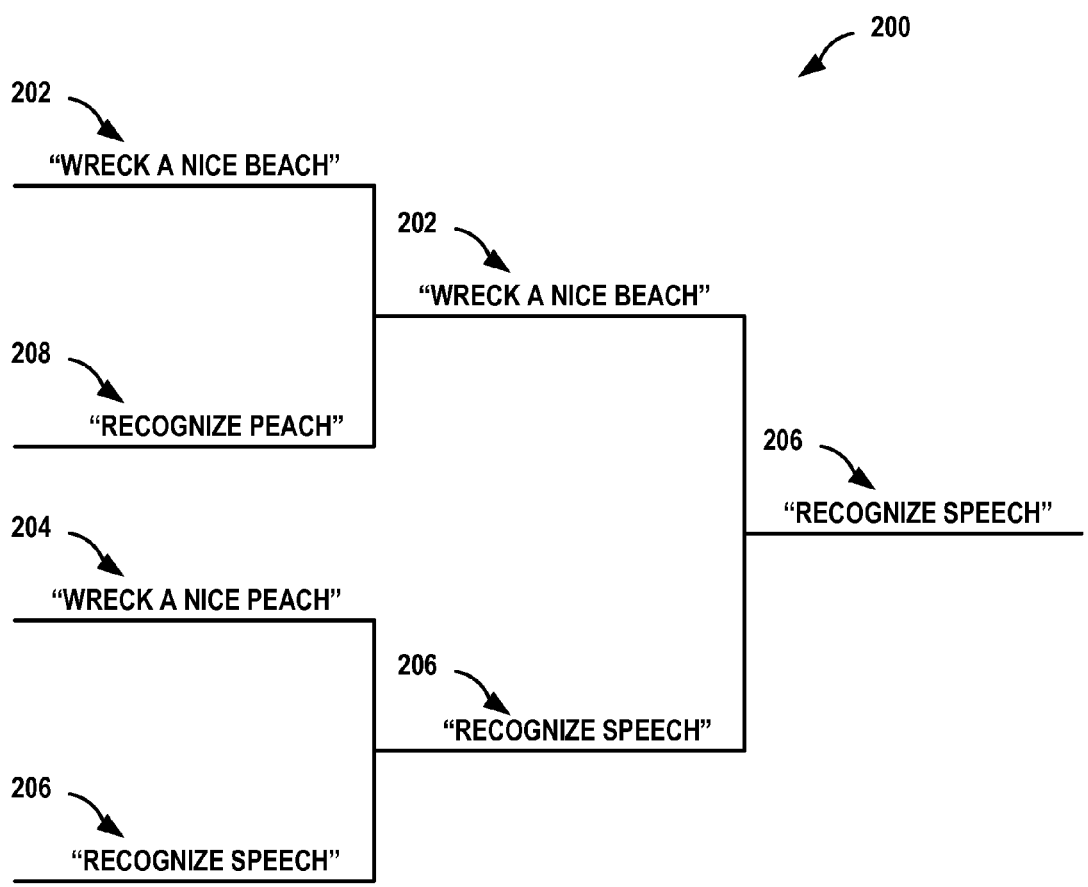
FIG. 2 is a block diagram illustrating an example tournament bracket according to some aspects of the present disclosure.

FIG. 2 is a block diagram illustrating an example tournament bracket 200. As shown in FIG. 2, a correct textual transcription 110 may be determined by having a plurality of text candidates 202, 204, 206, and 208 match up in a tournament bracket 200, such as a single-elimination tournament bracket. The plurality of text candidates 202, 204, 206, 208 may each be seeded, such as according to an estimated probability of each of the text candidates being the correct textual transcription of the vocal input. For example, each of the one or more ASR engines may be associated with an accuracy rating, and the plurality of text candidates 202, 204, 206, and 208 may be seeded according to the accuracy rating of the ASR engine that produced that text candidate. In some examples, a single ASR engine may produce the plurality of text candidates 202, 204, 206, and 208, and the candidates may be seeded according to a score or accuracy rating associated with each of the algorithms within the single ASR engine used to produce the text candidates.

For example, for a vocal input of "recognize speech", the one or more ASR engines may produce a first text candidate 202 of "wreck a nice beach" that is seeded first as having the highest estimated probability of being the correct textual transcription, a second text candidate 204 of "wreck a nice peach" that is seeded second as having the second-highest estimated probability, a third text candidate 206 of "recognize speech" that is seeded third as having the third-highest estimated probability, and a fourth text candidate 208 of "recognize peach" that is seeded fourth as having the lowest estimated probability. The tournament bracket 200 may be set up so that the highest seed faces the lowest seed in the first round, that the second-highest seed faces the second-lowest seed in the first round, and so on, so that ideally the highest seed may face the second-highest seed in the final round. Thus, in the first round, the first seeded first text candidate 202 of "wreck a nice beach" and the fourth-seeded fourth text candidate 208 of "recognize peach" may be presented as a pair to a user, and the second seeded second text candidate 204 of "wreck a nice peach" and the third seeded third text candidate 206 of "recognize speech" may also be presented as a pair to the user. The user may select the text candidate out of the pair of text candidates that appears most nonsensical to the user, and the selected text candidate may be eliminated as a possible correct textual transcription of the vocal input.

As can be seen in FIG. 2, the user may select the fourth seeded fourth text candidate 208 of "recognize peach" and the second seeded second text candidate 204 of "wreck a nice peach", thus eliminating those two text candidates 208 and 204. The candidates not selected by the user in the first round may then face off in a second round. In the second round, the first seeded first text candidate 202 of "wreck a nice beach" may be presented as a pair with the third seeded third text candidate 206 of "recognize speech" to the user, and the user may again select the text candidate out of the pair of text candidates that appears most nonsensical to the user. As can be seen in FIG. 2, the user may select the first seeded first text candidate 202 of "wreck a nice beach" as appearing most nonsensical to the user. Thus, the first text candidate 202 may be eliminated, and the third text candidate 206 of "recognize speech" may be determined to have a highest probability out of the plurality of text candidates 202, 204, 206, and 208 of being the correct textual transcription of the vocal input. Alternatively, instead of selecting the text candidate that appears most nonsensical to the user, the user may select the text candidate that appears most logical to the user, and the text candidates selected by the user may move on to the next round of the tournament bracket 200.

Although a particular user may not choose the correct text candidate that corresponds with the vocal input, the tournament bracket 200 may be repeatedly presented to a plurality of users until the text candidates have been presented a statistically valid number of times, or until a specific confidence level has been reached, so that the correct text candidate may be crowd sourced from the plurality of users. For example, each round described above can be determined using multiple users at least two, 10, 100, 500, or 1000 users. Different users can be involved in different rounds. In some cases, any single user is only asked for a selection of text candidates once for any particular vocal input.

Figure 3:
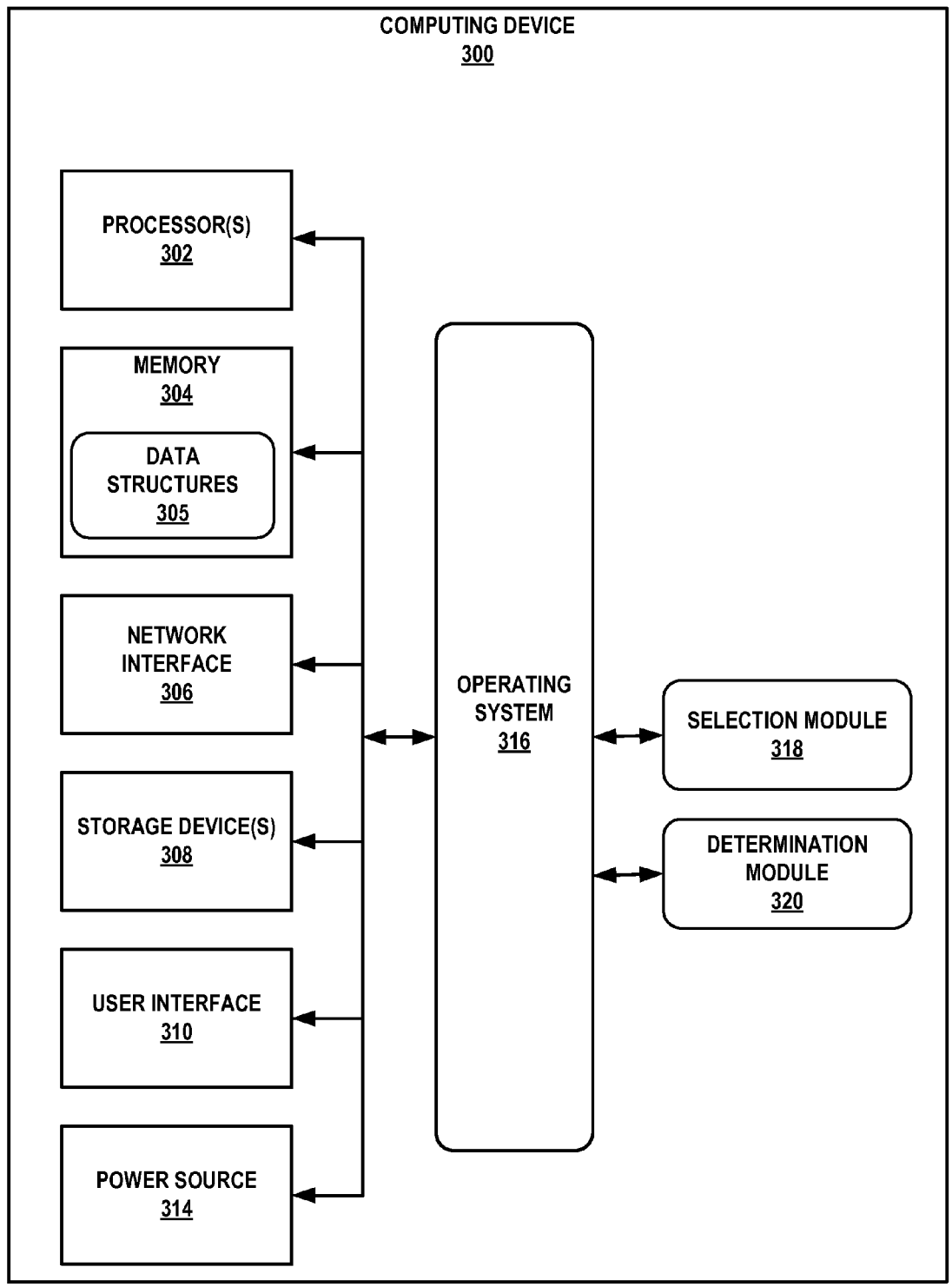
FIG. 3 is a block diagram illustrating an example computing device according to some aspects of the present disclosure.

FIG. 3 is a block diagram illustrating components of an example computing device 300, such as the computing device 106 shown in FIG. 1. FIG. 3 illustrates only one particular example of the computing device 300, and many other examples of the computing device 300 may be used in other instances.

As shown in the specific example of FIG. 3, the computing device 300 may include one or more processors 302, a memory 304, a network interface 306, one or more storage devices 308, a user interface 310, and a power source 314. The computing device 300 may also include an operating system 316, which may include modules and/or applications that are executable by the one or more processors 302 and the computing device 300. The computing device 300, in one example, may also include a selection module 318 and a determination module 320, both of which may be executable by the one or more processors 302 of the computing device 300. Each of the components 302, 304, 306, 308, 310, 314, 316, 318, and 320 may be interconnected (physically, communicatively, and/or operatively) for inter-component communications.

The one or more processors 302, in one example, may be configured to implement functionality and/or process instructions for execution within the computing device 300. For example, the one or more processors 302 may be capable of processing instructions stored in the memory 304 or instructions stored on the one or more storage devices 308. These instructions may define or otherwise control the operation of the operating system 316, the selection module 318, and the determination module 320.

The memory 304 may, in one example, be configured to store information within the computing device 300 during operation. The memory 304, in some examples, may be described as a computer-readable storage medium. In some examples, the memory 304 may be a temporary memory, meaning that a primary purpose of the memory 304 is not long-term storage. The memory 304 may, in some examples, be described as a volatile memory, meaning that the memory 304 does not maintain stored contents when the computing device 300 is turned off. Examples of volatile memories may include random access memories (RAM), dynamic random access memories (DRAM), static random access memories (SRAM), and other forms of volatile memories known in the art. In some examples, the memory 304 may be used to store program instructions for execution by the one or more processors 302. The memory 304 may, in one example, be used by software or applications running on the computing device 300 (e.g., the selection module 318 and the determination module 320) to temporarily store information during program execution.

In some examples, the memory 304 may include data structures 305. The data structures 305 may store the text transcriptions, such as the text transcriptions 110 shown in FIG. 1, produced by ASR engines, such as the one or more ASR engines 104 shown in FIG. 1. The data structures 305 may also store input made by users, such as the users' selection when presented with a plurality of text transcriptions. The data structures 305 may also store a count of the number of times each text transcription provided by the ASR engines 104 have been selected by users, and may also store the structure of tournament brackets, such as the tournament bracket 200 shown in FIG. 2. In some examples, the data structures 305 may also store any other relevant information of the computing device 300.

The one or more storage devices 308 may, in some examples, also include one or more computer-readable storage media. The one or more storage devices 308 may be configured to store larger amounts of information than the memory 304. The one or more storage devices 308 may further be configured for long-term storage of information. In some examples, the one or more storage devices may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

The computing device 300 may, in some examples, also include the network interface 306. The computing device 300 may, in one example, use the network interface 306 to communicate with external devices (such as the ASR engines 104 or the one or more users 108 shown in FIG. 1) via one or more networks. The network interface 306 may be a network interface card, such as an Ethernet card, an optical transceiver, a radio frequency transceiver, or any other type of device that can send and receive information. Other examples of such network interfaces may include Bluetooth, 3G and Wi-Fi radios in mobile computing devices as well as USB. In some examples, the computing device 300 may use the network interface 306 to wirelessly communicate with an external device such as a server, mobile phone, or other networked computing device.

The computing device 300 may, in one example, also include the user interface 310. The user interface 310 may be configured to receive input from a user (e.g., tactile, audio, or video feedback). The user interface 310 may include a touch-sensitive and/or a presence-sensitive screen or display, mouse, a keyboard, a voice responsive system, or any other type of device for detecting a command from a user. In some examples, the user interface 310 may include a touch-sensitive screen, mouse, keyboard, microphone, or camera.

The user interface 310 may also include, combined or separate from input devices, output devices. In this manner, the user interface 310 may be configured to provide output to a user using tactile, audio, or video stimuli. In one example, the user interface 310 may include a touch-sensitive screen or display, sound card, a video graphics adapter card, or any other type of device for converting a signal into an appropriate form understandable to humans or machines. In addition, the user interface 310 may include a speaker, a cathode ray tube (CRT) monitor, a liquid crystal display (LCD), or any other type of device that can generate intelligible output to a user.

The computing device 300, in some examples, may include a power source 314, which may be a rechargeable battery and may provide power to the computing device 300. The power source 314 may, in some examples, be a battery made from nickel-cadmium, lithium-ion, or other suitable material. In other examples, the power source 314 may be a power source capable of providing stored power or voltage from another power source.

The computing device 300 may also include the operating system 316. The operating system 316 may, in some examples, control the operation of components of the computing device 300. For example, the operating system 316 may, in one example, facilitate the interaction of the selection module 318 and the determination module 320 with the one or more processors 302, the memory 304, the network interface 306, the one or more storage devices 308, the user interface 310, and the power source 314.

The selection module 318 may be an application being executed on the one or more processors 302 that may be configured to repeatedly select two or more text candidates from a plurality of text candidates corresponding to vocal input. After each selection of the two or more text candidates, the user interface 310 and/or the network interface 306 may provide or otherwise communicate representations of the two or more text candidates to users, and may receive selections from users. In some examples, the selection module 318 may be configured to arrange a plurality of text candidates in a tournament bracket, such as the tournament bracket 200 shown in FIG. 2.

The determination module 320 may be an application being executed on the one or more processors 302 that may be configured to determine that a text candidate included in the plurality of text candidates has a highest probability out of the plurality of text candidates of being a correct textual transcription of the vocal input based at least in part on the selections from the one or more users received by the user interface 310.

Any applications (e.g., the selection module 318 and the determination module 320) implemented within or executed by the computing device 300 may be implemented or contained within, operable by, executed by, and/or be operatively/communicatively coupled to components of the computing device 300 (e.g., the one or more processors 302, the memory 304, the network interface 306, the one or more storage devices 308, the user interface 310, and/or the power source 314).

Figure 4:
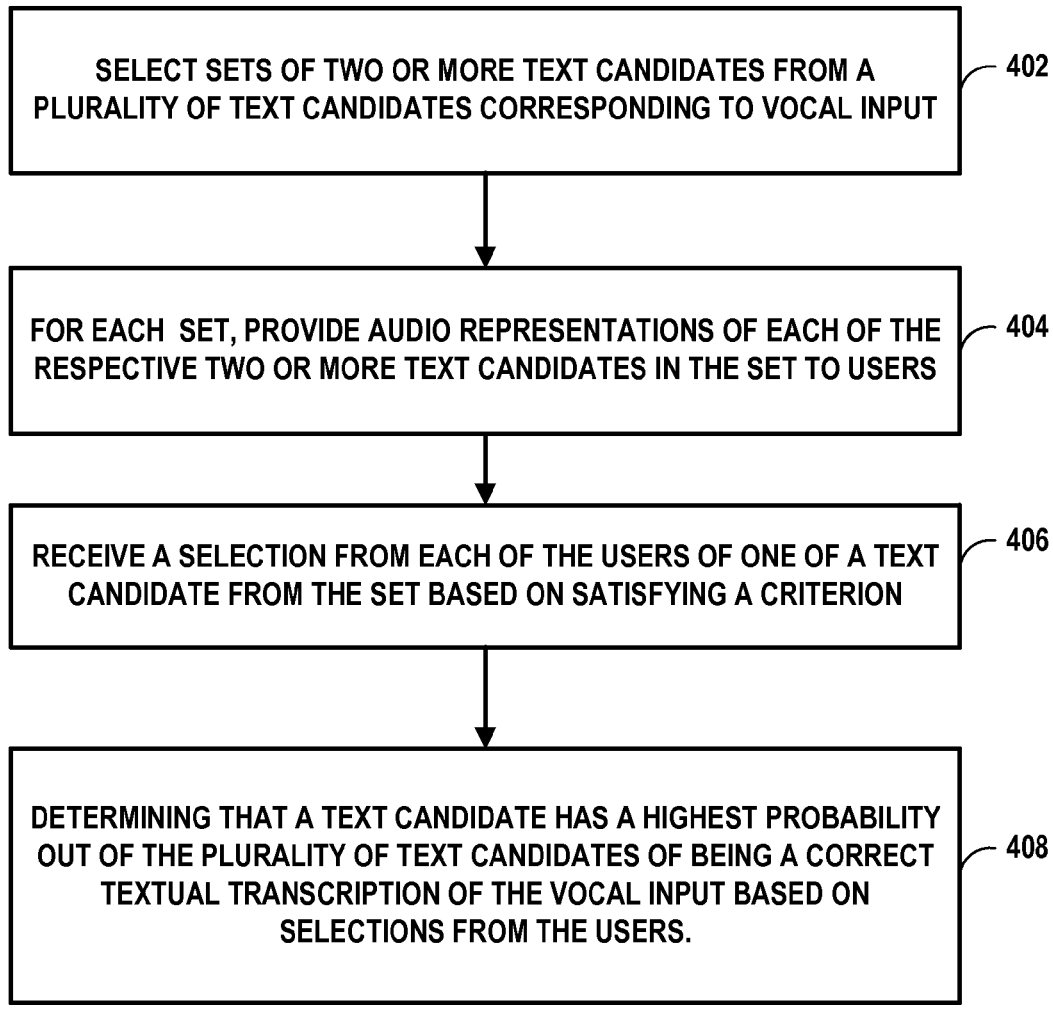
FIG. 4 is a flowchart illustrating an example method to crowdsource an example text transcription based on an example vocal input according to some aspects of the present disclosure.

FIG. 4 is a flowchart illustrating an example operation of a method to train one or more automatic speech recognition (ASR) engines. The method may include selecting, by a computing device, sets of two or more text candidates from a plurality of text candidates corresponding to vocal input (402). The method may also include, for each set, providing, by the computing device, representations of each of the respective two or more text candidates in the set to users, wherein the representations are provided as audio (404). The method may also include receiving a selection from each of the users of one of a text candidate from the set, wherein the selection is based on satisfying a criterion (406). The method may also include determining that a text candidate included in the plurality of text candidates has a highest probability out of the plurality of text candidates of being a correct textual transcription of the vocal input based at least in part on selections from the users (408).

The text candidate may be a least-selected text candidate by the one or more users out of the plurality of text candidates, and the method may further include prompting the one of the one or more users to select the one of the respective two or more text candidates that appears most nonsensical to the one of the one or more users. Alternatively, the text candidate may be a most-selected text candidate by the one or more users. The representations of the respective two or more text candidates may include audio representations or textual representations of the respective two or more text candidates. In some examples, the two or more text candidates consist of two text candidates.

The method may also include converting the vocal input into the plurality of text candidates corresponding to the vocal input. The providing of the representations of the respective two or more text candidates to the one of one or more users may include providing, by the computing device, the representations of the respective two or more text candidates to a phone being used by the one of one or more users. The method may also include, while each one of the plurality of text candidates has been provided by the computing device fewer than the threshold number of times, prompting the one of the one or more users to select one of the respective two or more transcribed text candidates.

The method may also include ranking the plurality of text candidates based on a probability of each text candidate within the plurality of text candidates being the correct textual transcription of the vocal input, and may further include seeding the plurality of text candidates in a tournament bracket according to the ranking of the plurality of text candidates.

The plurality of text candidates may be produced by a plurality of automatic speech recognition (ASR) engines, and the computing device may include the plurality of ASR engines. Alternatively, the plurality of text candidates may be produced by an ASR engine, and the computing device may include the ASR engine.

Repeatedly selecting the two or more text candidates may include repeatedly selecting, by the computing device, the two or more text candidates until each one of the plurality of text candidates has been selected by the computing device a threshold number of times. In some examples, the threshold amount of numbers is once.

Figure 5:
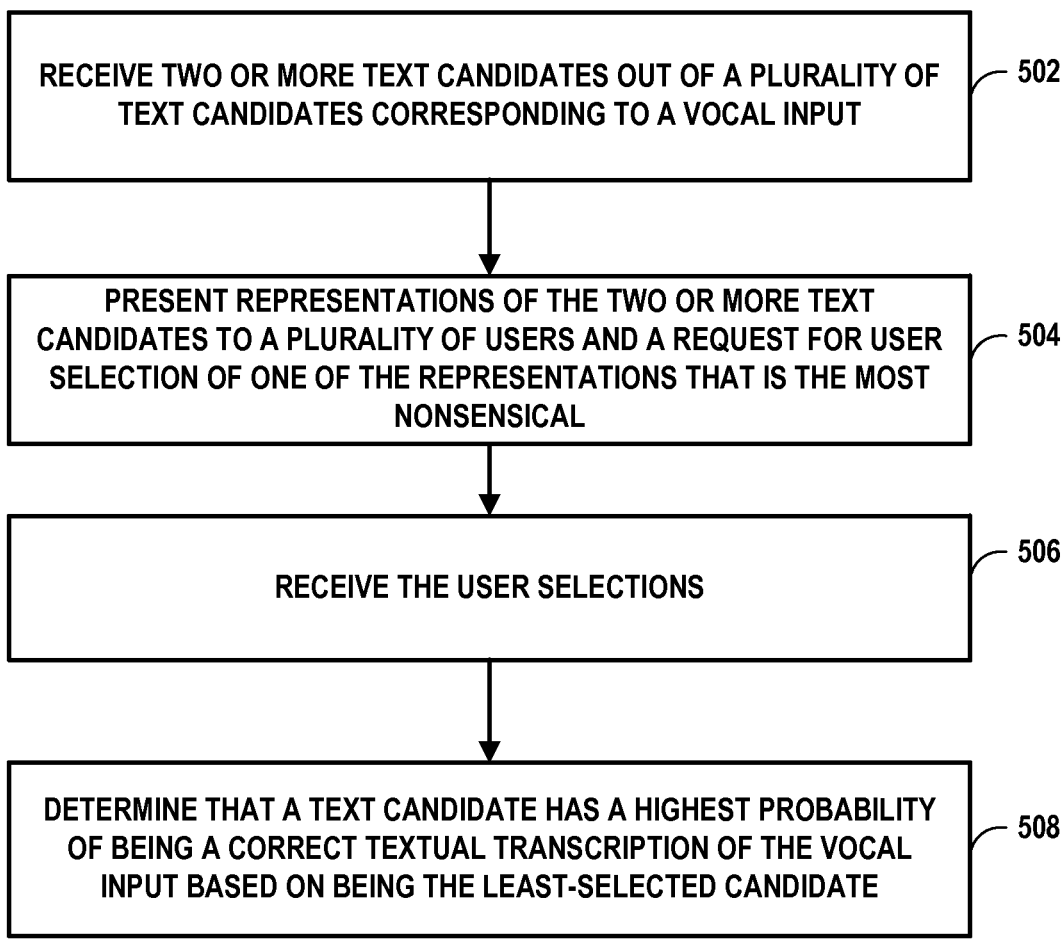
FIG. 5 is a flowchart illustrating an example method to crowdsource an example text transcription based on an example vocal input according to some aspects of the present disclosure.

FIG. 5 is a flowchart illustrating an example operation of a method to train one or more automatic speech recognition (ASR) engines. The method may include receiving, by a computing device, two or more text candidates out of a plurality of text candidates corresponding to a vocal input, wherein the plurality of text candidates are obtained from at least one automated speech recognition engine (502). The method may further include presenting, by the computing device, representations of the two or more text candidates to a plurality of users and a request for user selection of one of the representations that better satisfies a criterion, the criterion being most nonsensical (504). The method may further include receiving the user selections of one of the representations that better satisfies the criterion from one or more of the plurality users (506). The method may further include determining that a text candidate included in the plurality of text candidates has a highest probability out of the plurality of text candidates of being a correct textual transcription of the vocal input based at least in part on being the least-selected candidate of the user selections (508). In some examples, the computing device sends a set of representations to each of the plurality of users. In some examples, each text candidate is sent to at least 100 users.

Figure 6:
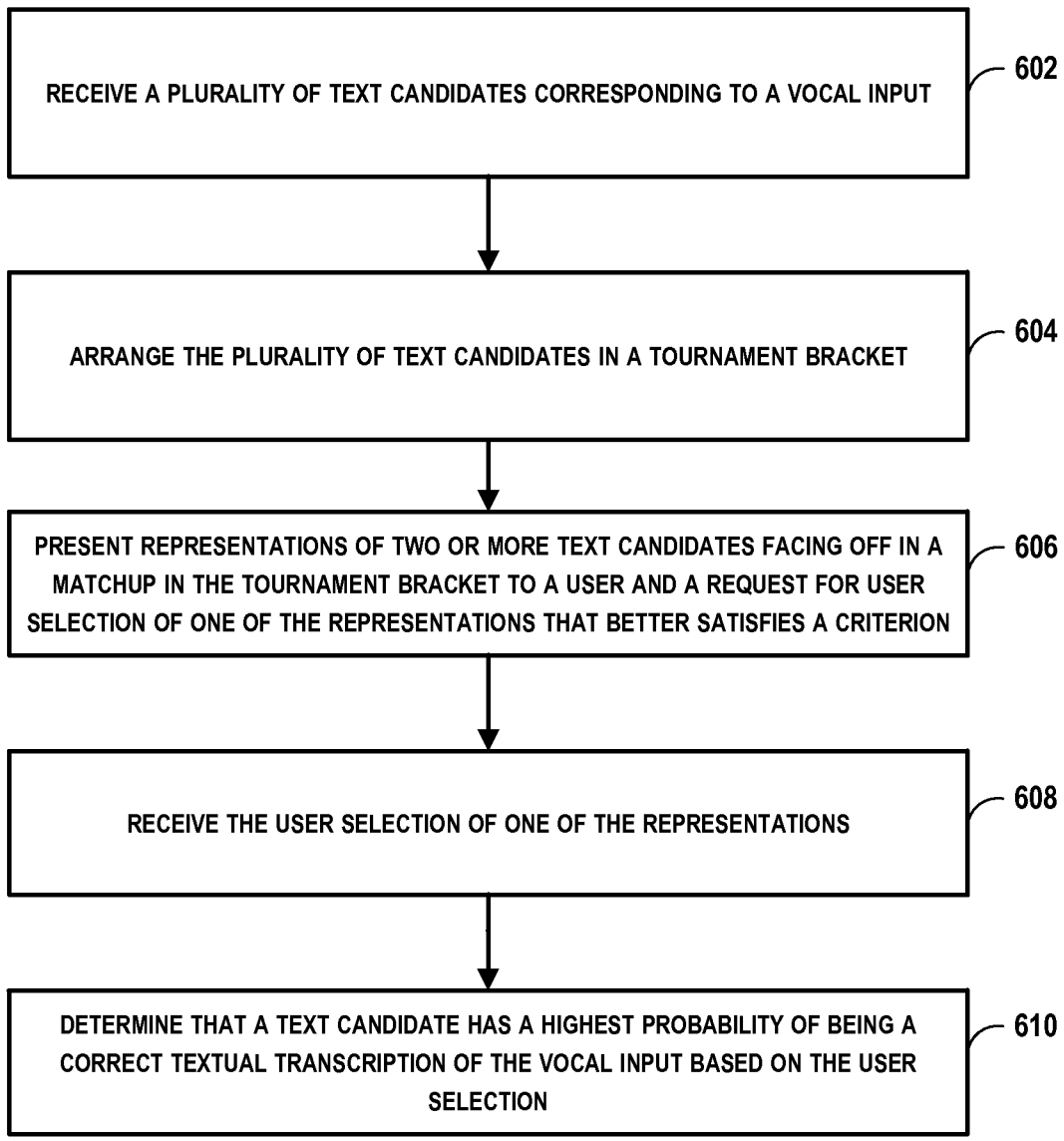
FIG. 6 is a flowchart illustrating an example method to crowdsource an example text transcription based on an example vocal input according to some aspects of the present disclosure.

FIG. 6 is a flowchart illustrating an example operation of a method to train one or more automatic speech recognition (ASR) engines. The method may include receiving, by a computing device, a plurality of text candidates corresponding to a vocal input, wherein the plurality of text candidates are obtained from an automated speech recognition engine are obtained from at least one automated speech recognition engine (602). The method may further include arranging, by the computing device, the plurality of text candidates in a tournament bracket (604). The method may further include presenting, by the computing device, representations of two or more text candidates facing off in a matchup in the tournament bracket to a user and a request for user selection of one of the representations that better satisfies a criterion (606). The method may further include receiving the user selection of one of the representations that better satisfies the criterion from the user (608). The method may further include determining that a text candidate included in the plurality of text candidates has a highest probability out of the plurality of text candidates of being a correct textual transcription of the vocal input based at least in part on the user selection (610). In some examples, the tournament bracket includes a single elimination tournament bracket. In some examples, the method may further include seeding the plurality of text candidates in the tournament bracket.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other aspects are within the scope of the following claims.

The invention claimed is:

1. A method comprising:
   selecting, by a computing device, sets of two or more text candidates from a plurality of text candidates corresponding to vocal input;
   for each set of the sets of two or more text candidates, outputting, by the computing device, representations of each of the respective two or more text candidates in the set to a plurality of users, wherein the representations are outputted as audio;
   receiving selections from each of the plurality of users of one of the respective two or more text candidates from each set, wherein the selections are based at least in part on satisfying a criterion; and
   determining that a text candidate included in the plurality of text candidates has a highest probability out of the plurality of text candidates of being a correct textual transcription of the vocal input based at least in part on the selections from the plurality of users, wherein the text candidate is a least-selected candidate by the plurality of users out of the plurality of text candidates.

2. The method of claim 1, further comprising:
   prompting the plurality of users to select the one of the respective two or more text candidates in each set that appears most nonsensical to the plurality of users.

3. The method of claim 1, wherein the representations of the respective two or more text candidates in each set comprise textual representations of the respective two or more text candidate.

4. The method of claim 1, further comprising:
converting the vocal input into the plurality of text candidates corresponding to the vocal input.

5. The method of claim 1, wherein outputting, by the computing device, the representations of each of the respective two or more text candidates to the plurality of users comprises:
for each set of the sets of two or more text candidates, outputting, by the computing device, the representations of each of the respective two or more text candidates to phones being used by the plurality of users.

6. The method of claim 1, further comprising:
while each one of the plurality of text candidates has been provided by the computing device fewer than a threshold number of times, prompting the plurality of users to select one of the respective two or more text candidates in each set.

7. The method of claim 1, further comprising:
ranking the plurality of text candidates based at least in part on a probability of each one of the plurality of text candidates being the correct textual transcription of the vocal input.

8. The method of claim 7, further comprising:
seeding the plurality of text candidates in a tournament bracket according to the ranking of the plurality of text candidates.

9. The method of claim 1, wherein:
the plurality of text candidates are produced by a plurality of automatic speech recognition (ASR) engines.

10. The method of claim 9, wherein the computing device includes the plurality of ASR engines.

11. The method of claim 1, wherein:
the plurality of text candidates are produced by an ASR engine.

12. The method of claim 11, wherein the computing device includes the ASR engine.

13. The method of claim 1, wherein selecting the sets of two or more text candidates comprises:
repeatedly selecting, by the computing device, the sets of two or more text candidates until each set of the two or more text candidates has been selected by the computing device at least a threshold number of times.

14. The method of claim 13, wherein the threshold number of times is once.

15. The method of claim 1, wherein each set of two or more text candidates consists of two text candidates.

16. A non-transitory computer-readable medium containing instructions that, when executed on at least one processor, cause the at least one processor to perform operations comprising:
selecting, by a computing device, sets of two or more text candidates from a plurality of text candidates corresponding to vocal input;
for each set of the sets of two or more text candidates, outputting, by the computing device, representations of each of the respective two or more text candidates in the set to a plurality of users, wherein the representations are outputted as audio;
receiving selections from each of the plurality of users of one of the respective two or more text candidates from each set, wherein the selections are based at least in part on satisfying a criterion; and
determining that a text candidate included in the plurality of text candidates has a highest probability out of the plurality of text candidates of being a correct textual transcription of the vocal input based at least in part on the selections from the plurality of users, wherein the text candidate is a least-selected candidate by the plurality of users out of the plurality of text candidates.

17. A computing device comprising:
one or more processors;
at least one module operable by the one or more processors to:
select sets of two or more text candidates from a plurality of text candidates corresponding to vocal input;
for each set of the sets of two or more text candidates, output representations of each of the respective two or more text candidates in the set to a plurality of users, wherein the representations are outputted as audio
receive selections from each of the plurality of users of one of the respective two or more text candidates from each set, wherein the selections are based at least in part on satisfying a criterion; and
determine that a text candidate included in the plurality of text candidates has a highest probability out of the plurality of text candidates of being a correct textual transcription of the vocal input based at least in part on the selections from the plurality of users, wherein the text candidate is a least-selected candidate by the plurality of users out of the plurality of text candidates.

18. A method comprising:
receiving, by a computing device, two or more text candidates out of a plurality of text candidates corresponding to a vocal input, wherein the plurality of text candidates are obtained from at least one automated speech recognition engine;
outputting, by the computing device, representations of the two or more text candidates to a plurality of users and a request for user selections of one of the representations that better satisfies a criterion, the criterion being most nonsensical;
receiving the user selections of one of the representations that better satisfies the criterion from one or more of the plurality users; and
determining that a text candidate included in the plurality of text candidates has a highest probability out of the plurality of text candidates of being a correct textual transcription of the vocal input based at least in part on being a least-selected candidate of the user selections.

19. The method of claim 18, wherein the computing device sends a set of the representations of the two or more text candidates to each of the plurality of users.

20. The method of claim 19, wherein each text candidate of the plurality of text candidates is sent to at least 100 users.

21. A computing device comprising:
one or more processors;
at least one module operable by the one or more processors to:
receive two or more text candidates out of a plurality of text candidates corresponding to a vocal input, wherein the plurality of text candidates are obtained from at least one automated speech recognition engine;
output representations of the two or more text candidates to a plurality of users and a request for user selections of one of the representations that better satisfies a criterion, the criterion being most nonsensical;

receive the user selections of one of the representations that better satisfies the criterion from one or more of the plurality users; and determine that a text candidate included in the plurality of text candidates has a highest probability out of the plurality of text candidates of being a correct textual transcription of the vocal input based at least in part on being a least-selected candidate of the user selections.

22. A method comprising:

receiving, by a computing device, a plurality of text candidates corresponding to a vocal input, wherein the plurality of text candidates are obtained from at least one automated speech recognition engine;

arranging, by the computing device, the plurality of text candidates in a tournament bracket;

outputting, by the computing device, representations of two or more text candidates facing off in a matchup in the tournament bracket to a user and a request for user selection of one of the representations that better satisfies a criterion;

receiving the user selection of one of the representations that better satisfies the criterion from the user; and determining that a text candidate included in the plurality of text candidates has a highest probability out of the plurality of text candidates of being a correct textual transcription of the vocal input based at least in part on the user selection.

23. The method of claim 22, wherein the tournament bracket includes a single elimination tournament bracket.

24. The method of claim 22, further comprising:

seeding the plurality of text candidates in the tournament bracket.

25. A computing device comprising:

one or more processors;

at least one module operable by the one or more processors to:

receive a plurality of text candidates corresponding to a vocal input, wherein the plurality of text candidates are obtained from at least one automated speech recognition engine;

arrange the plurality of text candidates in a tournament bracket;

output representations of two or more text candidates facing off in a matchup in the tournament bracket to a user and a request for user selection for one of the representations that better satisfies a criterion;

receive the user selection of one of the representations that better satisfies the criterion from the user; and determine that a text candidate included in the plurality of text candidates has a highest probability out of the plurality of text candidates of being a correct textual transcription of the vocal input based at least in part on the user selection.

\* \* \* \* \*